(12) United States Patent
Maetaki

(10) Patent No.: US 7,193,789 B2
(45) Date of Patent: Mar. 20, 2007

(54) OPTICAL SYSTEM

(75) Inventor: Satoshi Maetaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 11/264,951

(22) Filed: Nov. 1, 2005

(65) Prior Publication Data

US 2006/0109557 A1    May 25, 2006

(30) Foreign Application Priority Data

Nov. 19, 2004   (JP) ............................. 2004-335555

(51) Int. Cl.
*G02B 15/14* (2006.01)
*G02B 13/00* (2006.01)

(52) U.S. Cl. ...................... 359/687; 359/642

(58) Field of Classification Search ................ 359/642, 359/687, 745–748
See application file for complete search history.

(56) References Cited

U.S. PATENT DOCUMENTS

| | | | |
|---|---|---|---|
| 4,241,983 A | 12/1980 | Kitagishi |
| 4,348,084 A | 9/1982 | Kitagishi |
| 5,629,799 A | 5/1997 | Maruyama |
| 5,638,215 A | 6/1997 | Neil |
| 5,716,679 A | 2/1998 | Krug et al. |
| 5,731,907 A | 3/1998 | Sigler |
| 5,790,321 A | 8/1998 | Goto |
| 6,115,188 A | 9/2000 | Nishio |
| 6,931,207 B2 * | 8/2005 | Nanba .......................... 396/72 |
| 2002/0123549 A1 | 9/2002 | Border et al. |
| 2002/0156170 A1 | 10/2002 | Border et al. |
| 2002/0161092 A1 | 10/2002 | Border et al. |
| 2005/0168841 A1 | 8/2005 | Ogawa |

FOREIGN PATENT DOCUMENTS

| | | |
|---|---|---|
| EP | 1217393 A2 | 6/2002 |
| EP | 1217393 A3 | 6/2003 |
| EP | 1560056 A1 | 8/2005 |
| JP | 55-036886 A | 3/1980 |
| JP | 55-147606 A | 11/1980 |
| JP | 6-324262 A | 11/1994 |
| JP | 6-331887 A | 12/1994 |
| JP | 11-119092 A | 4/1999 |
| JP | 2002-207101 A | 7/2002 |
| JP | 2005-215387 A | 8/2005 |
| WO | WO-9710527 A1 | 3/1997 |

OTHER PUBLICATIONS

Schott: "Optisches Glas", 1981, Schott, XP-002367764.

* cited by examiner

*Primary Examiner*—Ricky Mack
*Assistant Examiner*—William Choi
(74) *Attorney, Agent, or Firm*—Canon USA, Inc. Intellectual Property Division

(57) ABSTRACT

In an optical system, there is disposed a solid material having refractive surfaces on both of the light incidence side and a light emergence side, and the Abbe number vd and the partial dispersion ratio θgF satisfy the conditions:

$$-2.100 \times 10^{-3} \cdot vd + 0.693 < \theta gF; \text{ and}$$

$$0.555 < \theta gF < 0.6.$$

14 Claims, 9 Drawing Sheets

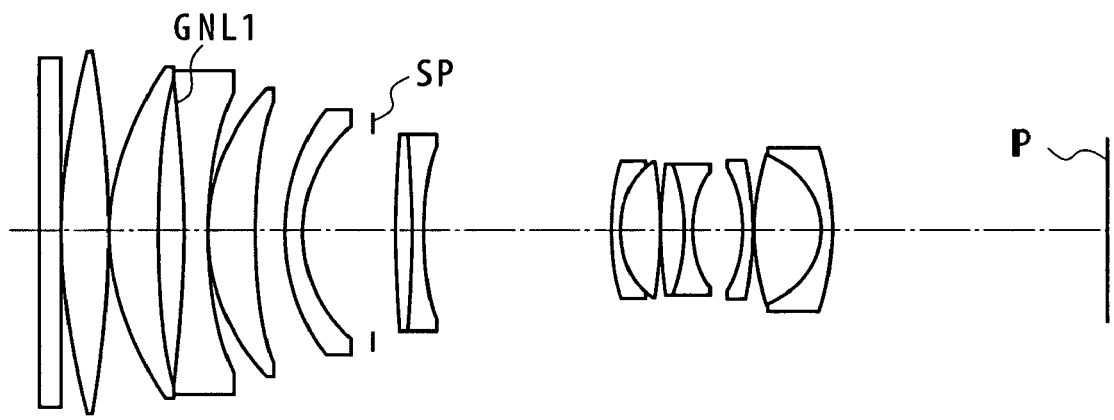
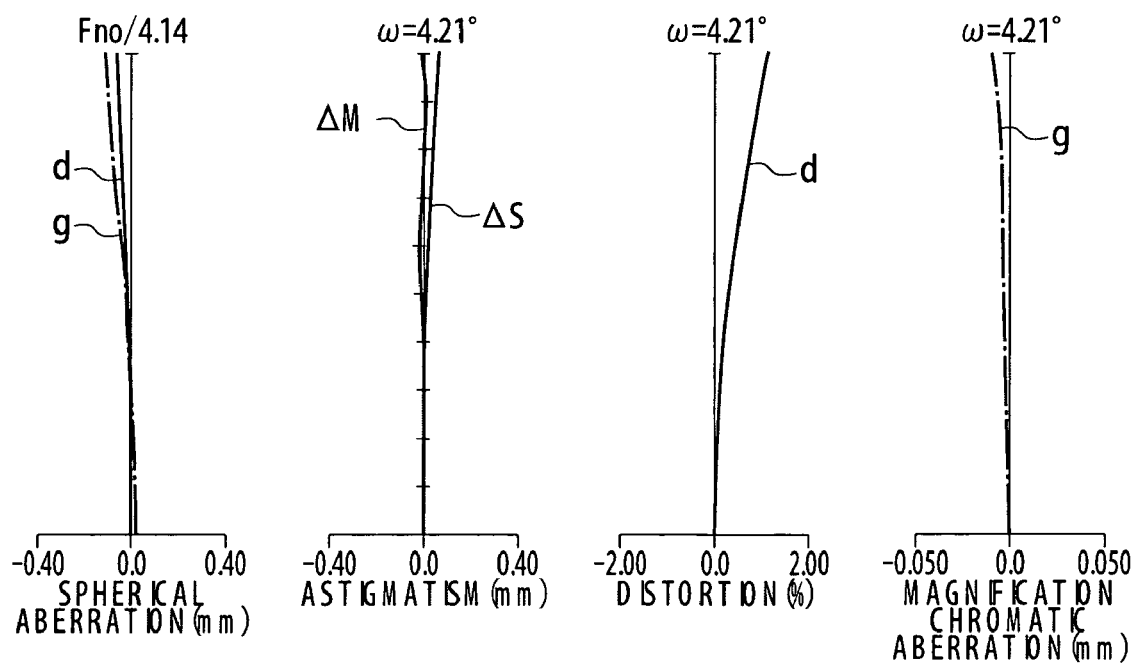

OPTICAL SYSTEM

BACKGROUND OF THE INVENTION

1. Field of the Invention

The present invention relates to an optical system, and is suitable for an optical system such as a camera for a silver salt film, a digital still camera, a video camera, a telescope, binoculars, a projector, or a copying machine.

2. Description of the Related Art

In general, in an optical system for use in a digital camera, a video camera or the like, when the total length of a lens is reduced to miniaturize the whole optical system, a large number of aberrations, more particularly chromatic aberrations such as axial chromatic aberration (longitudinal chromatic aberration) and chromatic aberration of magnification (lateral chromatic aberration) are generated, and the optical performance tends to drop. Especially in a telephoto type optical system in which the total lens length is reduced, the longer the focal length is, the more chromatic aberrations are generated. Here, the total lens length refers to the total optical length, and is the length from the front first lens surface to the image plane (or object plane).

As a method of reducing the generation of such chromatic aberration, there is known a method using an extraordinary partial dispersion material in an optical material, or a method using an diffractive optical element in an optical path.

In the telephoto type optical system, it is general to reduce the chromatic aberration using a positive-refractive-power lens constituted of a low-dispersion optical material (optical member having a large Abbe number) such as fluorite having extraordinary partial dispersion, and a negative-refractive-power lens constituted of a high-dispersion optical material in a front lens unit in which the passage position from the optical axis is comparatively high. There have been proposed various optical systems of such telephoto type (see, Japanese Examined Patent Publication (Kokoku) No. 60-49883 (corresponding to U.S. Pat. No. 4,241,983), Japanese Examined Patent Publication (Kokoku) No. 60-55805 (corresponding to U.S. Pat. No. 4,348,084) and Japanese Unexamined Patent Publication (Kokai) No. 11-119092 (corresponding to U.S. Pat. No. 6,115,188)).

Here, the paraxial marginal ray is a paraxial ray for the case when the focal length of the whole optical system is normalized into 1, and a ray having a height 1 from the optical axis is allowed to enter the system in parallel with the optical axis of the optical system. Additionally, it is assumed that an object is disposed on the left side of the optical system, and the light entering the optical system from the object side is treated as the light traveling from the left to the right. The paraxial chief ray is a paraxial ray passing through the intersection of the entrance pupil and the optical axis of the optical system among incident rays at −45° with respect to the optical axis in a case where the focal length of the whole optical system is normalized into 1. The incidence angle on the optical system is measured from the optical axis, a clockwise angle is regarded as positive, and a counterclockwise angle is regarded as negative.

Moreover, there is known a telephoto type optical system in which the chromatic aberration has been corrected using the diffractive optical element without using any abnormal portion dispersed optical material (see, Japanese Unexamined Patent Publication (Kokai) No. 6-324262 (corresponding to U.S. Pat. No. 5,790,321) and Japanese Unexamined Patent Publication (Kokai) No. 6-331887 (corresponding to U.S. Pat. No. 5,629,799)). In Japanese Unexamined Patent Publication (Kokai) No. 6-324262 and Japanese Unexamined Patent Publication (Kokai) No. 6-331887, a telephoto type optical system having an F number of about F 2.8 is disclosed in which the diffractive optical element is combined with a refractive optical element to thereby correct the chromatic aberration comparatively satisfactorily.

In general, the diffractive optical element, an absolute value of the numeric value corresponding to the Abbe number is as small as 3.45. The element has a characteristic that the chromatic aberration can be largely changed while hardly influencing spherical aberration, comatic aberration, and astigmatism, when the power (inverse number of a focal length) by diffraction is only slightly changed. Since diffraction light is to be handled, the power linearly changes with respect to the change of the wavelength of the incident light, and the wavelength characteristic of the chromatic aberration coefficient forms a completely straight line.

Therefore, to reduce the total lens length, corrections of the spherical aberration, the comatic aberration, and the astigmatism may be specified in performing the aberration correction. Moreover, since the chromatic aberration is corrected by the diffractive optical element, the glass material and the refractive power of the material of a constituent lens may be optimized to allow designing in such a manner as to obtain a linearity of the wavelength characteristic of the chromatic aberration coefficient regardless of the absolute amount of the chromatic aberration worsened by the reduction of the total length. As a result, a telephoto type optical system can be obtained in which the total lens length has been reduced.

Moreover, as the optical material having the function of correcting the chromatic aberration similar to the optical characteristic of the diffractive optical element, a liquid material is known which exhibits comparatively highly dispersed and comparatively extraordinary partial dispersion characteristics, and an achromatic optical system using the material is proposed (see, U.S. Pat. No. 5,731,907 and U.S. Pat. No. 5,638,215).

In a telephoto type optical system in which fluorite or the like is used in the optical material as disclosed in Japanese Examined Patent Publication (Kokoku) No. 60-49883, Japanese Examined Patent Publication (Kokoku) No. 60-55805 and Japanese Unexamined Patent Publication (Kokai) No. 11-119092, it is easy to correct the chromatic aberration in a case where the total lens length is made comparatively long. However, when the total lens length is reduced, many chromatic aberrations are generated, and it is difficult to correct them satisfactorily. In this method, the chromatic aberration generated in a front lens system having the positive refractive power is simply reduced utilizing the low dispersion and extraordinary partial dispersion present in a material such as fluorite. Even when worsened chromatic aberration accompanying the reduction of the total lens length is to be corrected, the chromatic aberration does not largely change unless the refractive power of the lens surface is largely changed in the lens using low-dispersion glass such as fluorite having a large Abbe number. Therefore, it is difficult to establish both correction of the chromatic aberration and correction of aberrations such as spherical aberration, comatic aberration, and astigmatism generated by the increasing the refractive power.

On the other hand, although the diffractive optical element has a sufficient function of correcting the chromatic aberration, diffraction light having an unnecessary diffraction order is generated in addition to diffraction light having a designed diffraction order for actual use, and a problem occurs that the unnecessary diffraction light forms colored flare light to spoil the image forming performance. As a method of reducing the unnecessary diffraction light, a method is known in which there is used a so-called laminated type diffractive optical element comprising a plurality of blaze type diffraction gratings laminated in the optical axis direction. Therefore, it is possible to concentrate effort on the designed diffraction order, and reduce the unnecessary diffraction light largely. However, there is a problem that flare by the unnecessary diffraction light still appears when a high-luminance object is photographed.

Moreover, as a method of manufacturing the diffractive optical element, a method is known in which the element is molded of an ultraviolet cured resin or the like. However, in this method, since sensitivity of diffraction efficiency of the diffractive optical element is remarkably high during manufacture, a very high mold or molding precision is required. As a result, it is difficult to manufacture the element, and manufacturing costs rise.

Since the materials disclosed in U.S. Pat. No. 5,731,907 and U.S. Pat. No. 5,638,215 are liquids, a structure to introduce and seal the liquid is required. In a case where the liquid is used in the optical material, it is difficult to manufacture the element. Characteristics such as refractive index and dispersion largely change with a temperature change, resistance to environment is not sufficient. Furthermore, since an interface between the liquid and air is not obtained, the sufficient ability to correct chromatic aberration is not easily obtained.

SUMMARY OF THE INVENTION

At least one exemplary embodiment is directed to an optical system which satisfactorily corrects miscellaneous aberrations including chromatic aberration and which is easy to manufacture and which is superior in resistance to environment.

At least one exemplary embodiment is directed to an optical system comprising refractive surfaces on both the light incidence side and the light emergence side, and having a solid material which satisfies the conditions:

$-2.100 \times 10^{-3} \cdot vd + 0.693 < \theta gF$; and $0.555 < \theta gF < 0.9$, wherein vd denotes the Abbe number, and θgF is the partial dispersion ratio.

Moreover, assuming that the partial dispersion ratio of this solid material is θgd, the material further can satisfy the conditions:

$-2.407 \times 10^{-3} \cdot vd + 1.420 < \theta gd$; and $1.2555 < \theta gd < 1.67$.

Here, definitions of the Abbe number vd, and the partial dispersion ratios θgF and θgd are the same as those for general use. That is, assuming that refractive indexes of the material with respect to a g-line (wavelength of 435.8 nm), an F-line (486.1 nm), a d-line (587.6 nm), and a C-line (656.3 nm) are Ng, Nd, NF, and NC, respectively, the Abbe number and the partial dispersion ratios are represented by the following equations, respectively:

$vd = (Nd-1)/(NF-NC)$;

$\theta gd = (Ng-Nd)/(NF-NC)$; and $\theta gF = (Ng-NF)/(NF-NC)$.

Further features of the present invention will become apparent from the following description of exemplary embodiments (with reference to the attached drawings).

BRIEF DESCRIPTION OF THE DRAWINGS

FIG. 1 is a sectional view of an optical system of a first embodiment;

FIG. 2 is an aberration diagram of the optical system of the first embodiment;

DESCRIPTION OF THE EMBODIMENTS

Figure 3:
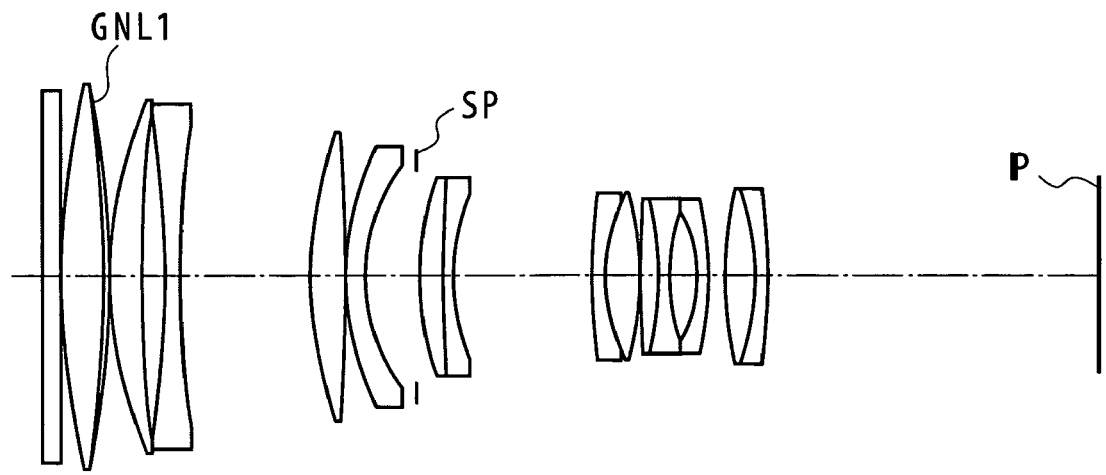
FIG. 3 is a sectional view of the optical system of a second embodiment.

An optical system of at least one exemplary embodiment will be described hereinafter.

An optical system of at least one exemplary embodiment can be used in an image pickup apparatus such as a digital camera, a video camera, or a camera for a silver salt film, an observation apparatus such as a telescope or binoculars, and an apparatus such as a copying machine or a projector.

The optical system of at least one exemplary embodiment can include a solid material (normal temperature and pressure) having a large (high) partial dispersion ratio is provided with a refracting function. That is, a refractive optical element (optical member) having a power is formed of a solid material having a large partial dispersion ratio.

It is to be noted that here the refractive optical element refers, for example, to a refractive lens or the like whose power is generated by the refracting function, and does not include any diffractive optical element whose power is generated by a diffracting function.

Moreover, the solid material refers to a material being solid in a state in which the optical system is used, and the state at a time such as the time of manufacture before the optical system is used may be any state. For example, even a material which is a liquid at the manufacturing time but which is cured to form the solid material corresponds to the solid material mentioned herein.

The optical member for use in the optical system of each embodiment has refractive surfaces on both the light incidence side and a light emergence side, and at least one of the refractive surfaces has the power. Moreover, assuming that the Abbe number is vd, and the partial dispersion ratio is θgF, the member is constituted of a material which satisfies the following condition equations (1) and (2) and which is solid at a normal temperature and pressure.

$$-2.100 \times 10^{-3} \cdot vd + 0.693 < \theta gF \quad (1)$$

$$0.555 < \theta gF < 0.9 \quad (2)$$

The chromatic aberration can be satisfactorily corrected over a broad wavelength band of the g-line to C-line by use of the solid material which satisfies the condition equations (1) and (2) as the optical refraction element in the optical system.

Furthermore, the solid material which satisfies the condition equations (1) and (2) can satisfy the following condition equations (3) and (4).

$$-2.407 \times 10^{-3} \cdot vd + 1.420 < \theta gd \quad (3)$$

$$1.2555 < \theta gd < 1.67 \quad (4)$$

When the condition equations (3) and (4) are simultaneously satisfied in addition to the condition equations (1) and (2), it is possible to correct the chromatic aberration between the g-line and the d-line. Accordingly, it is possible to perform denser chromatic aberration correction in a wavelength band of the g-line to C-line.

From the viewpoint of chromatic aberration correction, the solid material further can satisfy:

$$vd < 60 \quad (5).$$

Specific examples of the solid material (hereinafter referred to also as the "optical material") which satisfies the condition equations (1) and (2) include a resin. Among various resins, especially a UV cured resin (Nd=1.635, vd=22.7, θgF=0.69) or N-polyvinyl carbazole (Nd=1.696, vd=17.7, θgF=0.69) is an optical material which satisfies the condition equations (1) and (2). It is to be noted that the resin is not limited to them as long as the condition equations (1) and (2) are satisfied.

Moreover, as the optical material which has a property different from that of a general glass material, there is a mixture in which the following inorganic oxide nano particulates are dispersed in a synthetic resin. Examples of the mixture include $TiO_2$ (Nd=2.304, vd=13.8), $Nb_2O_5$ (Nd=2.367, vd=14.0), ITO (Nd=1.8581, vd=5.53), $Cr_2O_3$ (Nd=2.2178, vd=13.4), $BaTiO_3$ (Nd=2.4362, vd=11.3) and the like.

When particulates of $TiO_2$ (Nd=2.304, vd=13.8, θgF=0.87) among these inorganic oxides are dispersed in the synthetic resin at an appropriate volume ratio, the optical material is obtained which satisfies the above-described condition equations (1) and (2).

Furthermore, $TiO_2$ is a material for use in various applications, and is used as a material for evaporation constituting an optical thin film such as an antireflection film in an optical field. Additionally, it is used as a photocatalyst, a white pigment or the like, and $TiO_2$ particulates are used as a cosmetic material.

In each embodiment, the average diameter of the $TiO_2$ particulates dispersed in the resin can be about 2 nm to 50 nm in consideration of influences of scattering or the like, and a dispersant or the like can be added in order to suppress aggregation.

As a medium material for dispersing $TiO_2$, polymer can be used, and a high mass productivity can be obtained by photo or thermal polymerization molding using a molding mold or the like.

Moreover, as to the characteristic of the optical constant of polymer, polymer having a comparatively large partial dispersion ratio, polymer having a comparatively small Abbe number, or polymer which satisfies both of the characteristics can be used. For example, N-polyvinyl carbazole, styrene, polymethyl methacrylate (acryl) or the like can be applied. In an embodiment described later, an UV cured resin or N-polyvinyl carbazole is used as host polymer for dispersing the $TiO_2$ particulates. However, this is not to be regarded as limiting the invention.

The dispersion characteristic $N(\lambda)$ of the mixture in which the nano particulates are dispersed can be easily calculated by the following equation derived from the well known Drude equation. That is, the refractive index $N(\lambda)$ in a wavelength $\lambda$ is as follows:

$$N(\lambda) = [1 + V\{N_{TiO2}(\lambda) - 1\} + (1 - V)\{Np^2(\lambda) - \}]^{1/2},$$

wherein $\lambda$ denotes an arbitrary wavelength, NTiO denotes the refractive index of $TiO_2$, Np denotes the refractive index of polymer, and V denotes the fraction ratio of the total volume of the $TiO_2$ particulates with respect to the polymer volume.

Moreover, the optical material which satisfies the condition equations (1) and (2) can satisfy the following conditions, assuming that the absolute value of the temperature change of the refractive index of the d-line at 0° C. to 40° C. is |dn/dT|.

$$\text{That is, } |dn/dT| < 2.5 \times 10^{-4} (1/° C.) \quad (6).$$

Here, when a range deviates from that of the condition equation (6), it is difficult to maintain a satisfactory optical performance in a temperature range of 0° C. to 40° C.

In each embodiment, the optical material which satisfies the condition equations (1) and (2) is applied to a lens of the optical system or a layer (surface) disposed on the surface of the lens and having a refractive power.

Moreover, when the refractive surface constituted of this optical material is formed into an aspheric surface, chromatic aberration flare such as chromatic spherical aberration can be satisfactorily corrected. When this optical member and atmosphere such as air form an interface, or the member and an optical material having a comparatively low refractive index form the interface, the chromatic aberration can be comparatively largely changed by a slight curvature change of the interface.

Next, the influence on the aberration correction of the optical system will be described for the case when an optical member having a large partial dispersion ratio and having a power is used in the optical system.

In a wavelength-dependent characteristic (dispersion characteristic) of the refractive index of the optical material, the Abbe number indicates the overall inclination of a dispersion characteristic curve, and the partial dispersion ratio indicates the curve degree of the dispersion characteristic curve.

In general, as to the optical material, the refractive index on the short wavelength side is higher (the Abbe number indicates a positive value) than that on the long wavelength side, the dispersion characteristic curve has a downward protruding (partial dispersion ratio indicates a positive value) locus, and the change of the refractive index with respect to that of the wavelength increases toward the short wavelength side. Moreover, the optical material having a smaller Abbe number and larger dispersion has a larger partial dispersion ratio, and the dispersion characteristic curve tends to have a reinforced downward protruding shape.

In optical material having a large partial dispersion ratio, the wavelength-dependent characteristic curve of the chromatic aberration coefficient of the lens surface using the optical material indicates a larger curve on the short wavelength side as compared with a case where optical material having a small partial dispersion ratio is used.

On the other hand, in optical material having a small partial dispersion ratio, the wavelength-dependent characteristic curve of the chromatic aberration coefficient of the lens surface using the optical material indicates a shape closer to a linear shape in the whole wavelength band.

The partial dispersion ratio of general optical material such as glass material changes substantially linearly with reference to the Abbe number. Optical material having a characteristic deviating from this linear change is an optical material indicating an abnormal portion dispersed property. As optical material having an extraordinary partial dispersion, in general, fluorite or the like having small dispersion is known. However, even optical material having small dispersion and abnormal portion dispersion changes substantially uniformly with respect to the Abbe number. In a case where the optical material having extraordinary partial dispersion is used as a lens having a power, the wavelength-dependent characteristic curve of the chromatic aberration coefficient of the lens surface has higher linearity (smaller partial dispersion ratio) or larger curve (larger partial dispersion ratio) as compared with a case where general glass material is used.

The diffractive optical element has a remarkably small partial dispersion ratio in that the wavelength-dependent characteristic curve of the chromatic aberration coefficient has a high linearity. In the optical system using the diffractive optical element, the chromatic aberration can be satisfactorily corrected over the whole wavelength band. However, the influence of diffraction on the light is completely different from that of refraction. As to the general optical material, the Abbe number constantly indicates a positive value as described above, and the dispersion characteristic curve protrudes downwards more or less.

Conversely, in a diffractive optical element, the refractive index on the long wavelength side is higher than that on the short wavelength side, and the change of the refractive index with respect to the wavelength is uniform. Therefore, the Abbe number of the diffractive optical element indicates a negative value of −3.45, and the dispersion characteristic is linear.

In the optical system using the diffractive optical element utilizing the characteristics completely different from those of such general refraction material, comparatively large chromatic aberration generated in a portion other than the diffractive optical element is cancelled by a diffractive optical element portion, so that the chromatic aberration can be satisfactorily corrected over the whole wavelength band.

Thus, the chromatic aberration can be satisfactorily corrected over the whole wavelength band in the whole optical system using the optical material having a remarkably small partial dispersion ratio.

In each embodiment, the chromatic aberration is satisfactorily corrected over the whole wavelength band in the whole optical system using the optical material having a partial dispersion ratio higher than that of general glass material among the extraordinary partial dispersion materials.

In a case where there are used in the lens optical material having a smaller partial dispersion ratio and optical material having a higher partial dispersion ratio as compared with general glass material, a difference lies in that the curvature of the wavelength-dependent characteristic curve of the chromatic aberration coefficient in the lens surface on the short wavelength side is smaller or larger.

Moreover, the curvature on the short wavelength side depends on that of the dispersion characteristic of the optical material. Here, now an optical material will be described for simplicity, in which the refractive index of the d-line is equal to the Abbe number. Assuming that differences of the chromatic aberration coefficients on the short and long wavelength sides are $\Delta N_H$, $\Delta N_M$, and $\Delta N_L$ for the case when material having a large partial dispersion ratio, usual material (general optical material) having a usual partial dispersion ratio, and material having a small partial dispersion ratio are used as lenses with the same power, relations are represented by the following equation.

$$\Delta N_H > \Delta N_M > \Delta N_L > 0 \qquad (a)$$

An optical system constituted of a combination of two lenses will be described in which one of the lenses is constituted of an extraordinary partial dispersion material.

First, assuming that there are arranged two lenses constituted of material having a usual partial dispersion ratio and that having a small partial dispersion ratio with the same power, the difference between the chromatic aberration coefficients of the optical system on the short and long wavelength sides is $\Delta N_M + \Delta N_L$. This decreases by $\Delta N_M - \Delta N_L$ as compared with the use of two lenses of material having a usual partial dispersion ratio.

That is, the chromatic aberration can be decreased as compared with a case where two lenses constituted of material having a usual partial dispersion ratio are used.

Next, there will be described a combination of material having a usual partial dispersion ratio and that having a large partial dispersion ratio. The difference between the chromatic aberration coefficients of the optical system on the short and long wavelength sides is $\Delta N_M + \Delta N_H$.

This increases by $\Delta N_H - \Delta N_M$ as compared with the use of two lenses of material having a usual partial dispersion ratio. Therefore, assuming that the chromatic aberration on the short wavelength side can be decreased in a case where material having a small curvature and a small partial dispersion ratio is used, conversely the chromatic aberration on the short wavelength side is increased in a case where material having a large curvature and a large partial dispersion ratio is used. However, this is a case where material having a large partial dispersion ratio and that having a small partial dispersion ratio are used with the same power.

In this case, the sign of the power of the lens using material having a large partial dispersion ratio is reversed. That is, the sign of the power of one of two arranged lenses is reversed, and material having a large partial dispersion ratio is used. Then, in a case where material having a large partial dispersion ratio is used, conversely, the aberration on the short wavelength side can be decreased by $\Delta N_H - \Delta N_M$ as compared with a case where two lenses are used which are constituted of material having a usual partial dispersion ratio.

Even when materials having a usual partial dispersion ratios are combined, it is difficult to correct the chromatic aberration satisfactorily in the whole wavelength band simultaneously with respect to the curvature component and the inclination component of the wavelength-dependent characteristic curve of the chromatic aberration coefficient. Therefore, it is possible to correct the chromatic aberration appropriately using material which has a small partial dispersion ratio and whose curvature component on the short wavelength side can be decreased as compared with glass material having a usual partial dispersion ratio. However, from a viewpoint that the chromatic aberration on the short wavelength side be decreased, the same is applicable in a case where material having a large partial dispersion ratio is used with a power reverse to that of material having a small partial dispersion ratio. It is to be noted that when the sign of the power differs, material having a large partial dispersion ratio and that having a small partial dispersion ratio have reverse functions even in a portion other than the short wavelength side. Therefore, the way to select another glass material of the optical system for balancing is also reversed.

This will be described in an example of an achromatic function in a telephoto lens constituted of a refractive optical system portion GNL using material having a large partial dispersion ratio and a refractive optical system portion G using usual material whose partial dispersion ratio is not large.

First, the chromatic aberration of the portion G is corrected to a certain degree for the system of this portion. From this state, material having a comparatively large partial dispersion ratio is selected as a negative lens constituting the portion G. Here, in general, material having a large partial dispersion ratio simultaneously has large dispersion. Therefore, the wavelength-dependent characteristic curve of the chromatic aberration coefficient of the portion G curves more largely as compared with the original state, and the whole inclination changes.

In this state, an appropriate power is given to the portion GNL. Moreover, material having a comparatively large dispersion is also selected as a positive lens constituting the portion G. Additionally, in a case where the portion GNL is constituted of general optical material having a uniform partial dispersion ratio with respect to the Abbe number, the portion GNL simultaneously contributes at a certain ratio to the curvature component and the inclination component of the wavelength-dependent characteristic curve of the chromatic coefficient of the portion G. As a result, the components cannot be simultaneously cancelled.

On the other hand, when the portion GNL is constituted of material having a large partial dispersion ratio as compared with general material, the portion GNL contributes mainly to the curvature component of the whole wavelength-dependent characteristic curve of the chromatic aberration of the portion G. Therefore, mainly the curvature component only can be cancelled.

As a result, mainly the curvature component of the whole wavelength-dependent characteristic curve of the chromatic aberration of the portion G in the portion GNL, and mainly the inclination component in the positive lens constituting the portion G can be cancelled independently and simultaneously, respectively.

Moreover, when the absolute value of the Abbe number of the portion GNL is small, that is, the dispersion is large, one can correct the chromatic aberration independently. This will be described using the axial chromatic aberration coefficient and the magnification chromatic aberration coefficient of the lens surface.

Assuming that the power change of the surface of the refraction lens is $\Delta\psi$, the change $\Delta L$ of the axial chromatic aberration coefficient in the lens surface and the change $\Delta T$ of the magnification chromatic aberration coefficient are represented as follows.

$$\Delta L \propto \Delta\psi/v \quad \text{(b)}$$

$$\Delta T \propto \Delta\psi/v \quad \text{(c)}$$

As apparent from the formulas (b) and (c), the changes $\Delta L$ and $\Delta T$ of the respective aberration coefficients with respect to the power change of the lens surface increase, when the absolute value of the Abbe number $v$ is smaller (i.e., the dispersion is larger). Therefore, when material having a small absolute value of the Abbe number $v$ and having a large dispersion is used, the power change amount for obtaining necessary chromatic aberration can be reduced.

This means that the chromatic aberration can be controlled without having a large influence on spherical aberration, comatic aberration, and astigmatism in astigmatismus, and independency of chromatic aberration correction is enhanced.

Conversely, when material having a small dispersion is used, the power change amount for obtaining the necessary chromatic aberration increases. Accordingly, miscellaneous aberrations such as spherical aberration largely change, and the independency of the chromatic aberration correction weakens. Therefore, it is important in the aberration correction that the surface of at least one of the lenses constituting the optical system be a refraction lens surface formed of a high-dispersion material.

Moreover, since the portion GNL is combined with general optical material for use, the partial dispersion ratio of the material for use in the portion GNL can be different from that of the general optical material, optionally without excessive differences.

In a case where material far different from the general optical material is used as the lens, the curvature of the wavelength-dependent characteristic curve of the chromatic aberration coefficient of the lens surface on the short wavelength side is especially large. To cancel this large curvature, the power of another lens has to be strengthened. Eventually, a large influence is exerted on the spherical aberration, the comatic aberration, the astigmatism or the like, and it is therefore difficult to correct the aberration.

That is, it is important that the material of the portion GNL should be the optical material having a larger partial dispersion ratio as compared with the general optical material, and the partial dispersion ratio should not be far different from that of the general optical material. The condition equation (1) and (2) show the relation between the Abbe number vd for satisfactorily correcting the chromatic aberration based on the above-described principle, and the partial dispersion ratio $\theta gF$.

It is to be noted that when the numeric value range of the condition equation (1) is set to the following range, a further satisfactory chromatic aberration correcting effect can be expected.

$$-2.100 \times 10^{-3} \cdot vd + 0.693 < \theta gF <$$

$$-1.231 \times 10^{-3} \cdot vd + 0.900 \quad \text{(1a)}$$

The range can be set to the following range.

$$-2.100 \times 10^{-3} \cdot vd + 0.693 < \theta gF <$$

$$-1.389 \times 10^{-3} \cdot vd + 0.823 \quad \text{(1b)}$$

The range can also be set to the following range.

$$-1.682 \times 10^{-3} \cdot vd + 0.700 < \theta gF <$$

$$-1.682 \times 10^{-3} \cdot vd + 0.756 \quad \text{(1c)}$$

When the numeric value range of the condition equation (2) satisfies the condition equations (1), (1a), (1b), or (1c), and is set to the following range, a more satisfactory chromatic aberration correcting effect can be expected.

$$0.555 < \theta gF < 0.86 \quad \text{(2a)}$$

The range can be set to the following range.

$$0.555 < \theta gF < 0.80 \quad \text{(2b)}$$

When the numeric value range of the condition equation (3) is set to the following range, a more satisfactory chromatic aberration correcting effect can be expected.

$$-2.407 \times 10^{-3} \cdot vd + 1.420 < \theta gd <$$

$$-1.152 \times 10^{-3} \cdot vd + 1.651 \quad (3a)$$

The range can also be set to the following range.

$$-2.407 \times 10^{-3} \cdot vd + 1.420 < \theta gd <$$

$$-1.865 \times 10^{-3} \cdot vd + 1.572 \quad (3b)$$

The range can also be set to the following range.

$$-2.076 \times 10^{-3} \cdot vd + 1.426 < \theta gd <$$

$$-2.076 \times 10^{-3} \cdot vd + 1.512 \quad (3c)$$

When the numeric value range of the condition equation (4) satisfies the condition equations (3), (3a), (3b), or (3c), and is set to the following range, a more satisfactory chromatic aberration correcting effect can be expected.

$$1.255 < \theta gd < 1.61 \quad (4a)$$

The range can also be set to the following range.

$$1.255 < \theta gd < 1.54 \quad (4b)$$

When the numeric value range of the condition equation (5) is set to the following range, a more satisfactory chromatic aberration correcting effect can be expected.

$$vd < 45 \quad (5a)$$

The range can also be set to the following range.

$$vd < 30 \quad (5b)$$

An embodiment will be described in which the optical member (lens or layer) constituted of optical material satisfying the condition equations (1) and (2) is applied to a specific optical system. Here, as the optical material which satisfies the condition equations (1) and (2), there is used a UV cured resin 1, N-polyvinyl carbazole, or a $TiO_2$ particulate dispersed material in which $TiO_2$ is dispersed in the UV cured resin or N-polyvinyl carbazole as host polymer. It is to be noted that there are used two types (UV cured resin 1, UV cured resin 2) of UV cured resins in which the $TiO_2$ particulates are dispersed.

Figure 12:
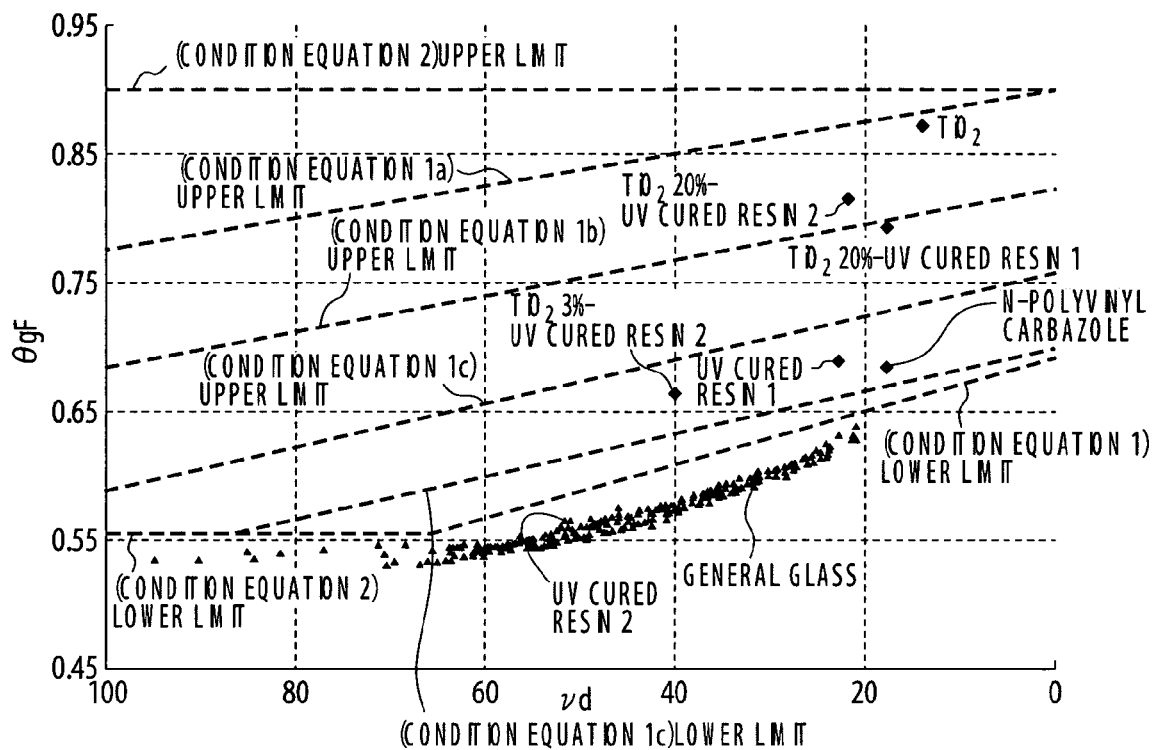
FIG. 12 is an explanatory view of ranges of condition equations (1) and (2)
Figure 13:
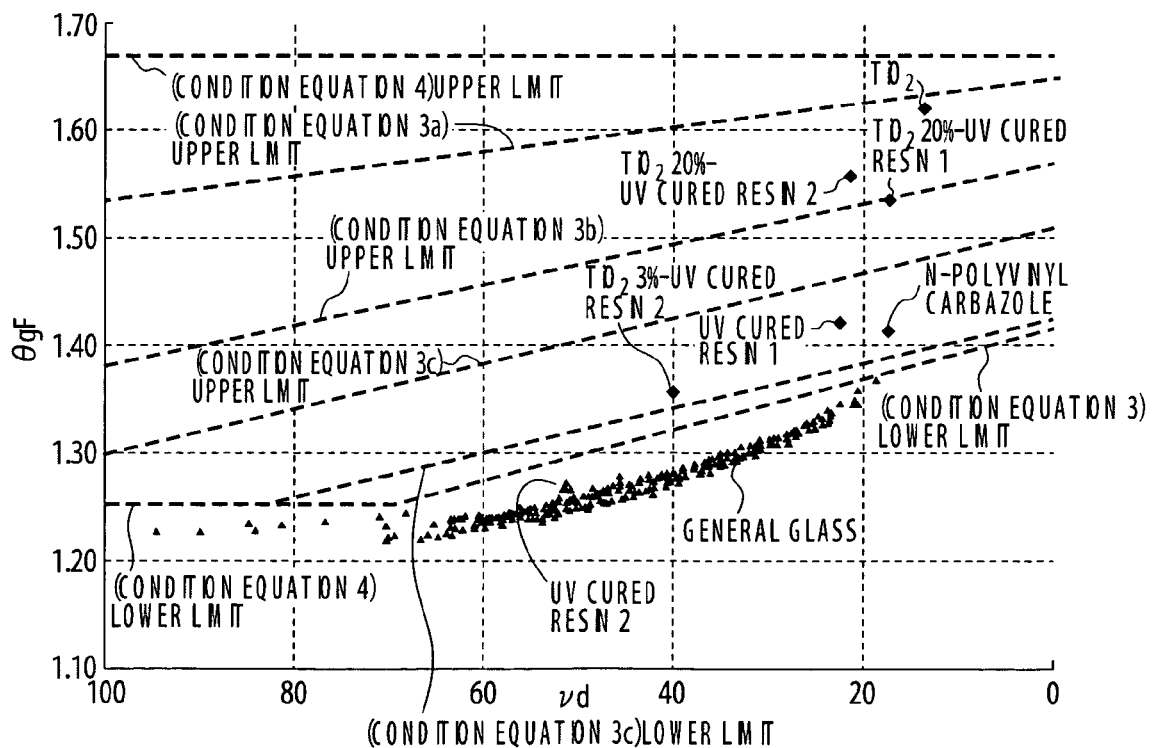
FIG. 13 is an explanatory view of ranges of condition equations (3) and (4).

Optical constant values of the optical materials (UV cured resin 1, $TiO_2$ particulate dispersed material, N-polyvinyl carbazole) used in Examples 1 to 5 described later are shown in Table-1, and a single optical constant value of the UV cured resin 2 or $TiO_2$ constituting the $TiO_2$ particulate dispersed material is shown in Table-2. Each table indicates values of the refractive indexes and the Abbe numbers of the respective optical materials with respect to the d-line, g-line, C-line, and F-line, and the partial dispersion ratios. FIGS. 12 and 13 show relations between these optical materials and the condition equations (1) to (5).

FIG. 1 is a sectional view of an optical system according to Numerical Example 1, and shows an example in which the UV cured resin 1 is used in an ultra telephoto lens having a focal length of 300 mm. In FIG. 1, the lens (layer) formed of the UV cured resin 1 is denoted with GNL1, and SP denotes an aperture stop.

In FIG. 1, IP denotes an image plane. There is disposed a corresponding photosensitive surface in the imaging surface of a solid-state image pickup element (photoelectric conversion element) such as a CCD sensor or a CMOS sensor in a case where the optical system is used as a photographing optical system of a video camera or a digital still camera, and in the film surface in a case where the system is used as a photographing optical system of a camera for a silver salt film.

In FIG. 1, the left side corresponds to the object side (front), the right side corresponds to the image side (rear), and this also applies to another numerical example.

FIG. 2 is an aberration diagram in a state in which an infinitely far object of the optical system of Numerical Example 1 is focused.

In the aberration diagram, d and g denote the d-line and the g-line, respectively, ΔM and ΔS are a meridional image plane and a sagital image plane, Fno denotes F number, ω denotes a half field angle, and the magnification chromatic aberration is represented by the g-line. This also applies to another aberration diagram.

In the optical system of Numerical Example 1, a lens (optical member having the power) constituted of a UV cured resin 1 (Table-1) is introduced on the object side on which the passage position from the optical axis of a paraxial marginal ray is comparatively high. Moreover, when a positive refractive power is given to the lens (layer) GNL1 formed of the UV cured resin 1, and mainly axial chromatic aberration is corrected, there is obtained a very compact ultra telephoto lens having a telescopic ratio of 0.677.

FIG. 3 is a sectional view of an optical system according to Numerical Example 2, and shows an example in which a mixture obtained by dispersing $TiO_2$ particulates in a UV cured resin 1 at a volume ratio of 20% is used in an ultra telephoto lens having a focal length of 300 mm. In FIG. 3, a lens (layer) formed of a $TiO_2$ particulate dispersed material is denoted with GNL1, SP denotes an aperture stop, and IP denotes the image plane.

Figure 4:
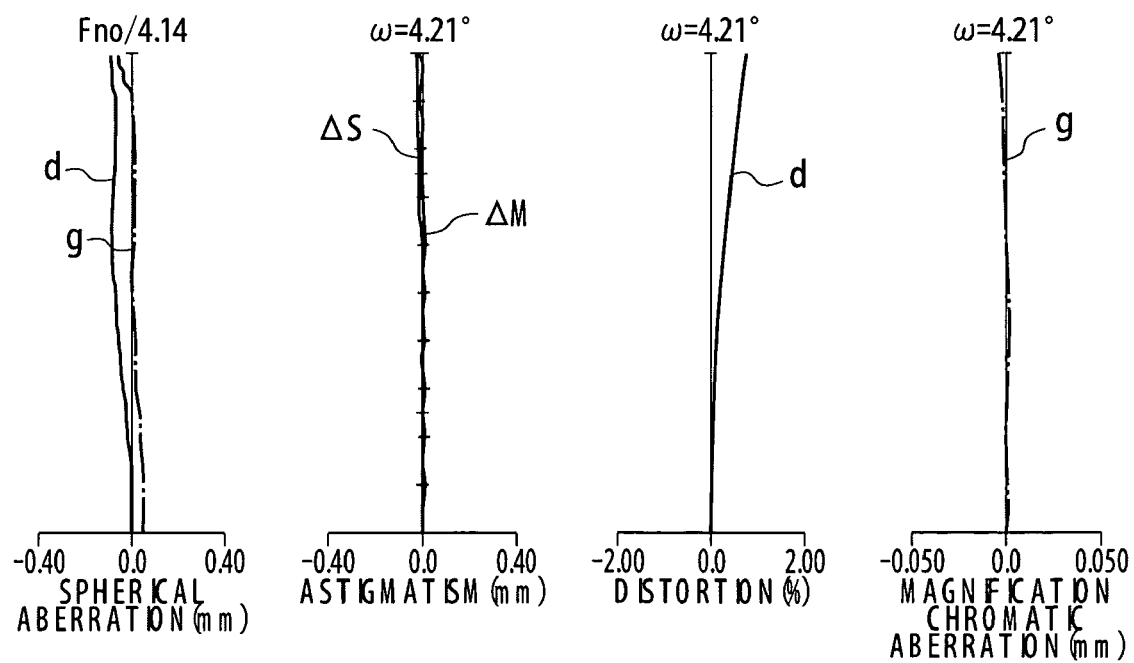
FIG. 4 is an aberration diagram of the optical system of the second embodiment.

FIG. 4 is an aberration diagram in a state in which an infinitely far object of the optical system of Numerical Example 2 is focused.

In the optical system of Numerical Example 2, a lens constituted of the $TiO_2$ particulate dispersed material is introduced on the object side on which the passage position from the optical axis of a paraxial marginal ray is comparatively high. Moreover, when a positive refractive power is given to the lens (layer) GNL1 formed of the $TiO_2$ particulate dispersed material, and mainly axial chromatic aberration is corrected, there is obtained a very compact ultra telephoto lens having a telescopic ratio of 0.700.

Figure 5:
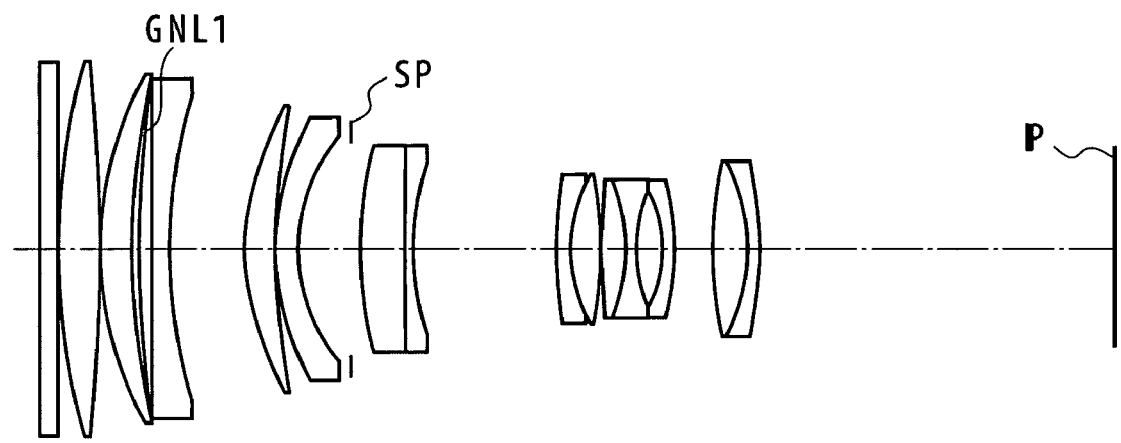
FIG. 5 is a sectional view of the optical system of a third embodiment.
Figure 6:
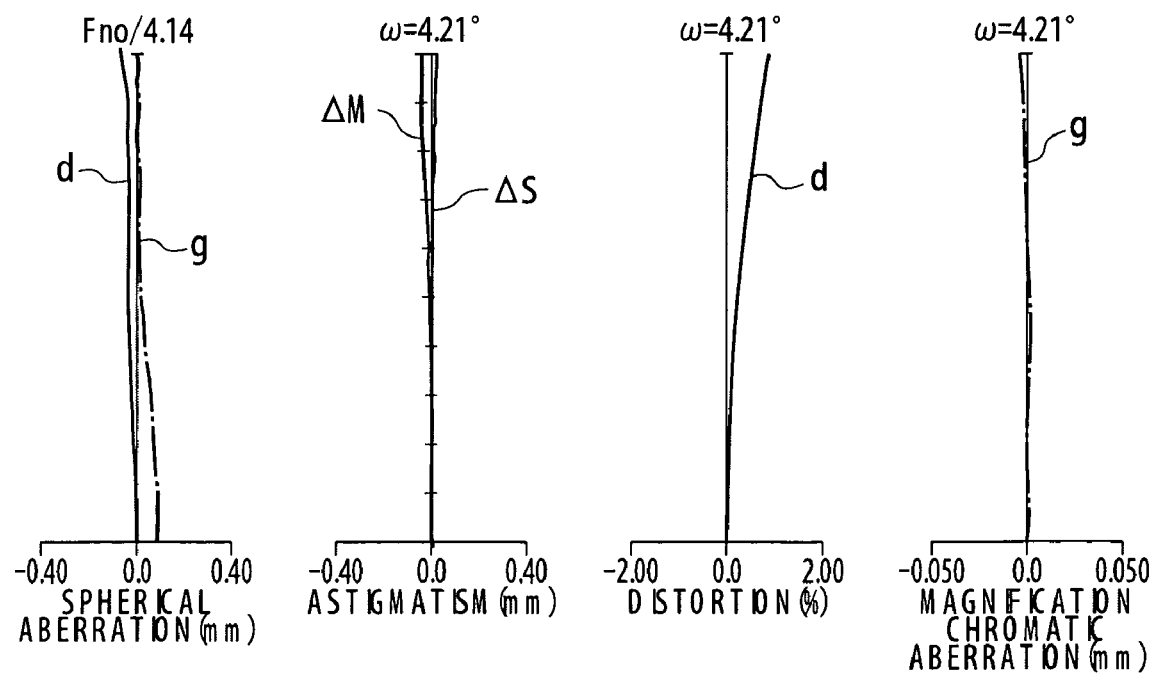
FIG. 6 is an aberration diagram of the optical system of the third embodiment.

FIG. 5 is a sectional view of an optical system according to Numerical Example 3, and shows an example in which a mixture obtained by dispersing $TiO_2$ particulates in a UV cured resin 2 at a volume ratio of 20% is used in an ultra telephoto lens having a focal length of 300 mm. In FIG. 5, a lens (layer) formed of a $TiO_2$ particulate dispersed material is denoted with GNL1, SP denotes an aperture stop, and IP denotes an image plane. FIG. 6 is an aberration diagram in a state in which an infinitely far object of the optical system of Numerical Example 3 is focused.

In the optical system of Numerical Example 3, a lens constituted of the $TiO_2$ particulate dispersed material is introduced on the object side on which the passage position from the optical axis of a paraxial marginal ray is comparatively high. Moreover, when a positive refractive power is given to the lens (layer) GNL1 formed of the $TiO_2$ particulate dispersed material, and mainly axial chromatic aberration is corrected, there is obtained a very compact ultra telephoto lens having a telescopic ratio of 0.700.

Figure 7:
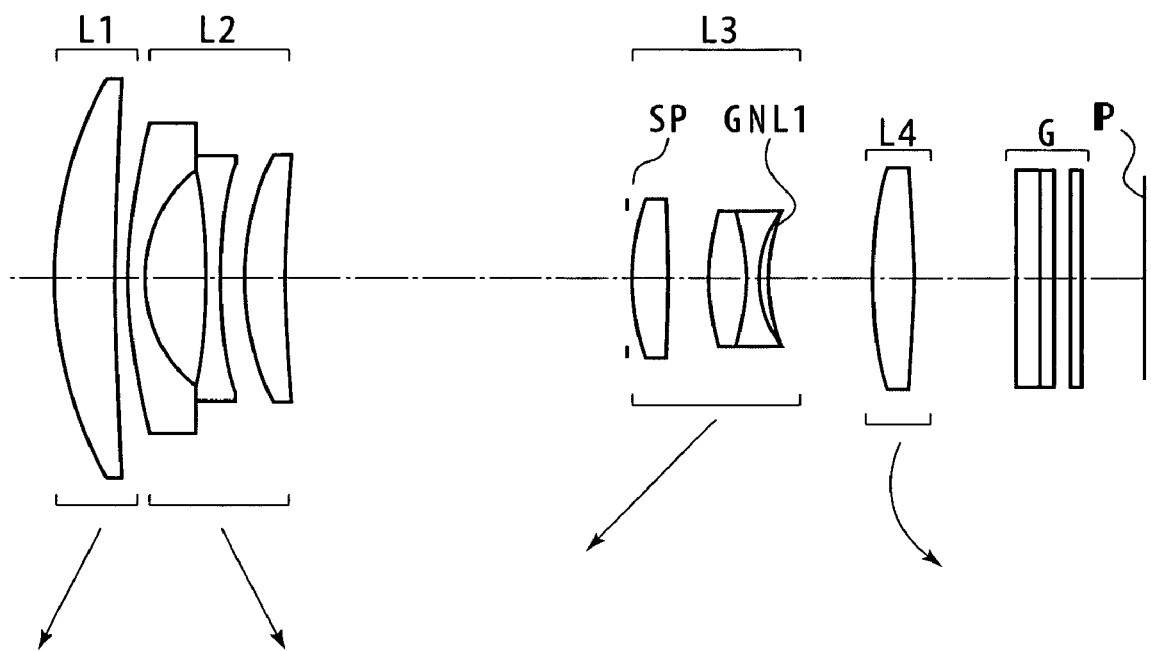
FIG. 7 is a sectional view of the optical system of a fourth embodiment.

FIG. 7 is a sectional view of an optical system according to Numerical Example 4, and shows an example in which a lens constituted of N-polyvinyl carbazole is used in a part of a zoom lens having a four unit constitution having a zoom ratio of about 4.

In FIG. 7, L1 denotes a first lens unit having a positive refractive power, L2 denotes a second lens unit having a negative refractive power, L3 denotes a third lens unit having a positive refractive power, and L4 denotes a fourth lens unit having a positive refractive power. Moreover, a lens (layer) formed of N-polyvinyl carbazole is denoted with GNL1, SP denotes an aperture stop, and IP denotes the image plane.

In the figure, G denotes an insertion filter, an optical low pass filter, an infrared cut filter or the like.

Figure 8A:
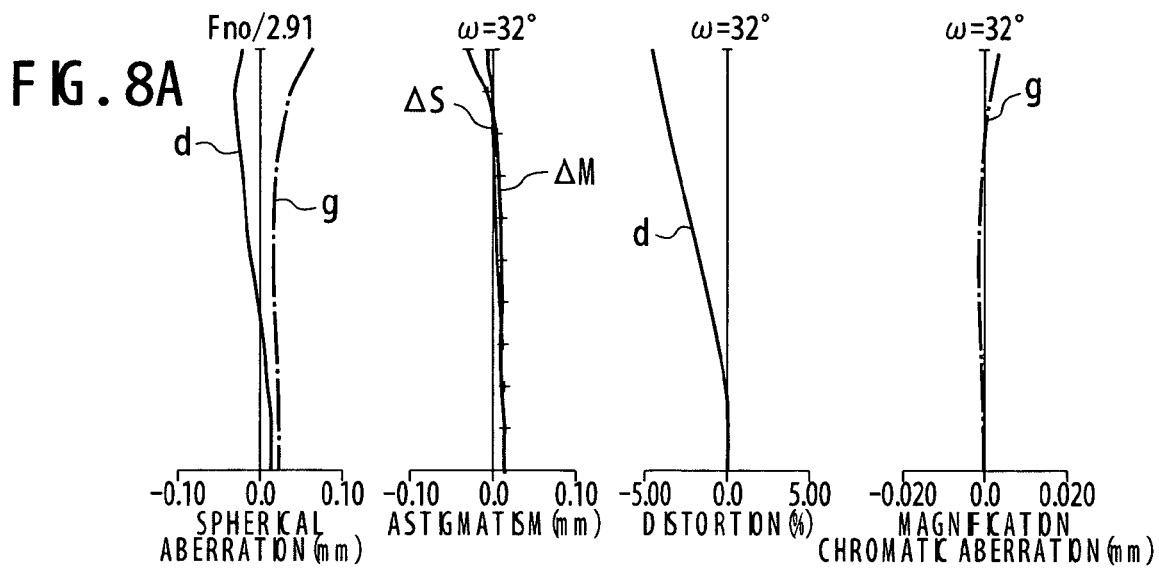
FIGS. 8A–8C are aberration diagrams of the optical system of the fourth embodiment.
Figure 8B:
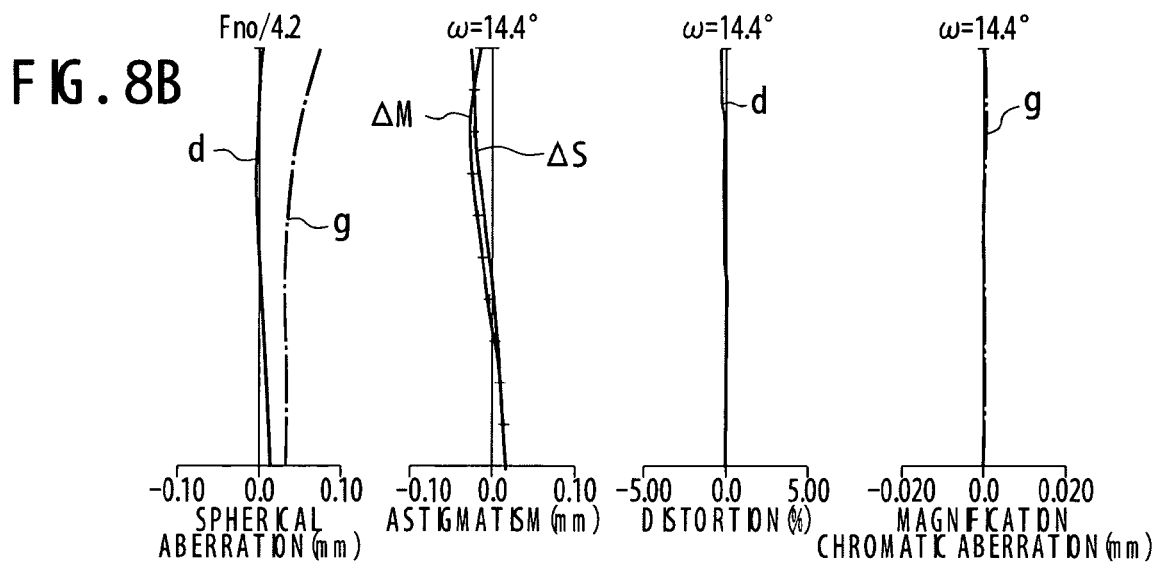
Figure 8C:
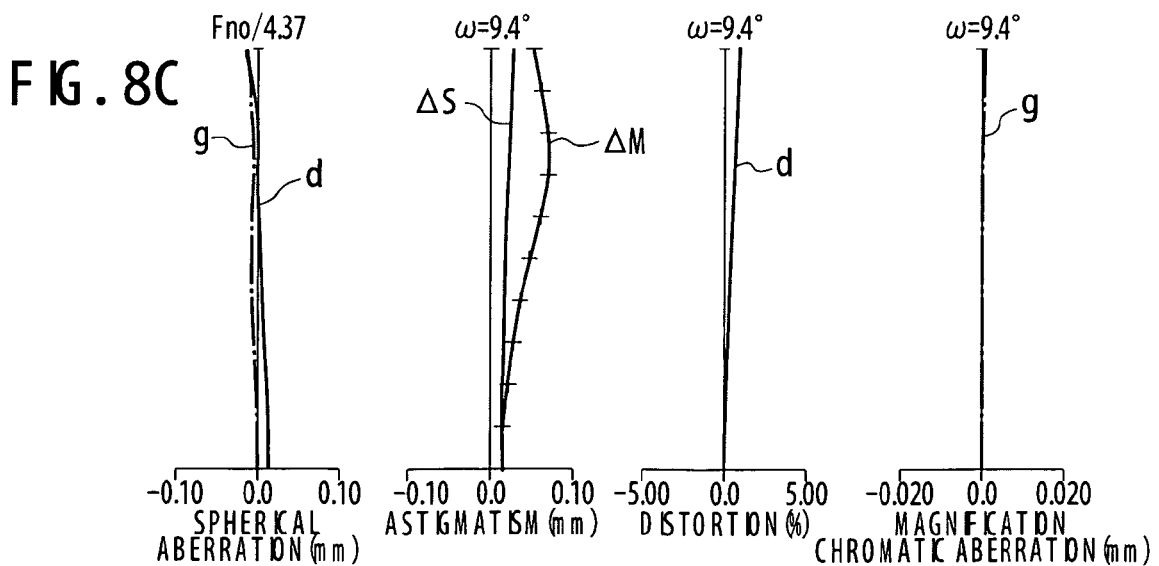

FIGS. 8(A) to (C) are aberration diagrams in a focused state on an infinitely far object at the wide angle end, an intermediate focal length, and the telescopic end of the optical system of Numerical Example 4, respectively.

In the optical system of Numerical Example 4, a lens (layer) constituted of N-polyvinyl carbazole is introduced in the third lens unit L3 on the image side on which the passage position from the optical axis of the paraxial chief ray is comparatively high among the lens units constituting the zoom lens.

Moreover, when a positive refractive power is imparted to the lens (layer) GNL1 formed of N-polyvinyl carbazole, and mainly magnification chromatic aberration is corrected, a compact structure is achieved.

Figure 9:
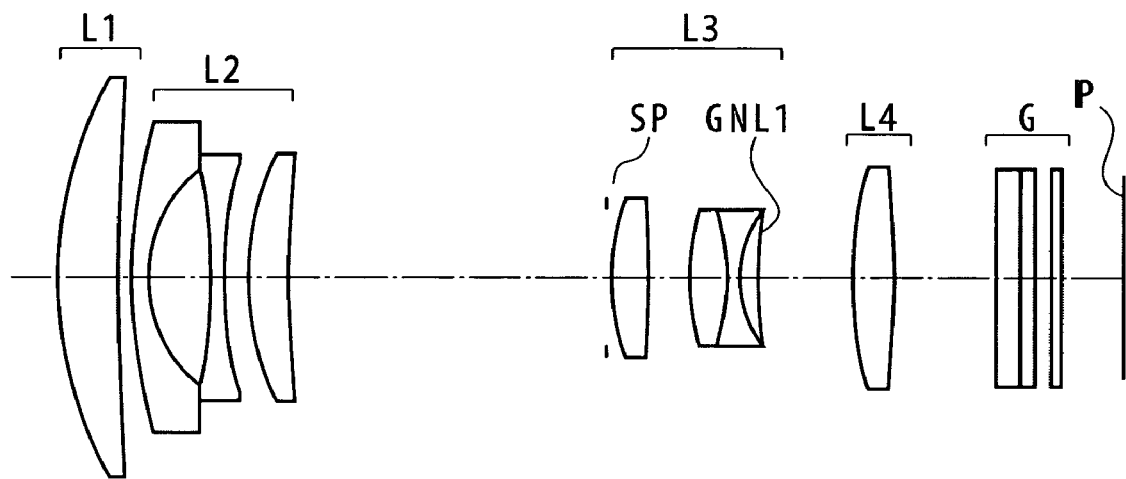
FIG. 9 is an optical sectional view of the optical system of a fifth embodiment.

FIG. 9 is a sectional view of an optical system according to Numerical Example 5, and shows an example in which a lens constituted of a mixture obtained by dispersing $TiO_2$ particulates in a UV cured resin 2 is used in a part of a zoom lens having a four unit constitution having a zoom ratio of about 4.

Figure 10:
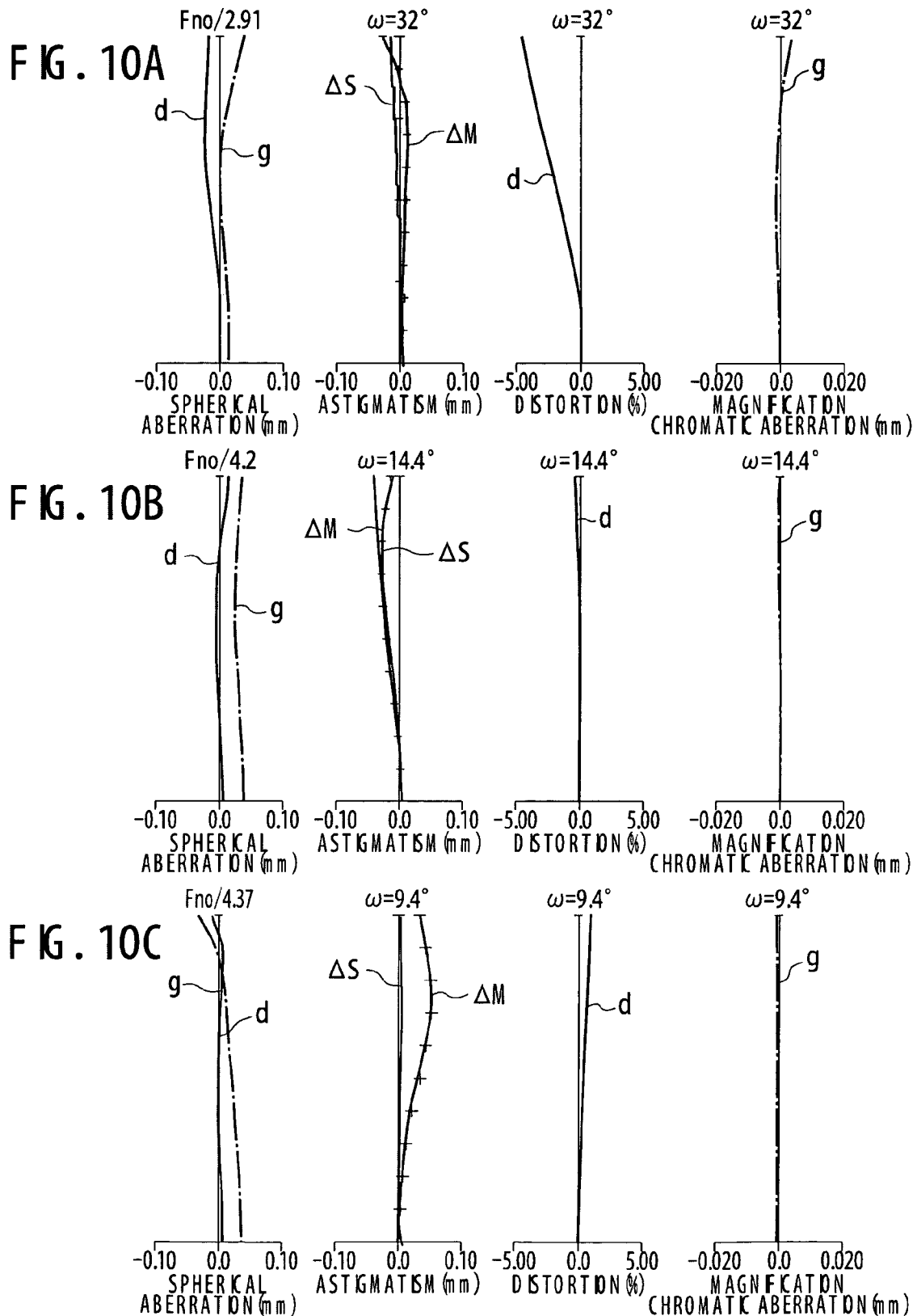
FIGS. 10A–10C are aberration diagrams of the optical system of the fifth embodiment.

In FIG. 9, L1 denotes a first lens unit having a positive refractive power, L2 denotes a second lens unit having a negative refractive power, L3 denotes a third lens unit having a positive refractive power, and L4 denotes a fourth lens unit having a positive refractive power. Moreover, a lens (layer) formed of a $TiO_2$ particulate dispersed material is denoted with GNL1, SP denotes an aperture stop, and G denotes a glass block. FIGS. 10(A) to (C) are aberration diagrams in a focused state on an infinitely far object at the wide angle end, an intermediate focal length, and the telescopic end of the optical system of Numerical Example 5, respectively.

In the optical system of Numerical Example 5, a lens constituted of the $TiO_2$ particulate dispersed material is introduced in the third lens unit L3 on the image side on which the passage position from the optical axis of the paraxial chief ray is comparatively high among the lens units constituting the zoom lens.

Moreover, when a positive refractive power is imparted to the lens (layer) GNL1 formed of a material obtained by dispersing the $TiO_2$ particulates in the UV cured resin 2 at a volume ratio of 3%, and mainly a magnification chromatic aberration is corrected, a compact structure is achieved.

Specific numeric value data of Numerical Examples 1 to 5 will be shown hereinafter. In each numerical example, i denotes the number of the surface counted from the object side, Ri denotes a curvature radius of the i-th optical surface (i-th surface), Di denotes the axial interval between the i-th surface and the (i+1)-th surface, and Ni and vi denote the refractive index and the Abbe number of the material of the i-th (excluding a lens (layer) formed of the resin or the $TiO_2$ particulate dispersed material) optical member with respect to the d-line, respectively. The refractive index and Abbe number of a lens GNLj formed of the resin or the $TiO_2$ particulate dispersed material with respect to the d-line are separately denoted with NGNLj and vGNLj (j=1, 2, ...), respectively. Moreover, f denotes the focal length, Fno denotes the F number, and ω denotes the half field angle.

Moreover, assuming that X is a displacement amount from a surface vertex in the optical axis direction, h is the height from the optical axis in a direction vertical to the optical axis, r denotes the paraxial curvature radius, k denotes the conic constant, and B, C, D, E, ... denote aspheric coefficients of orders, the aspheric shape is represented by the following.

$$x(h) = \frac{(1/r)h^2}{1+\sqrt{\{1-(1+k)(h/r)^2\}}} + Bh^4 + Ch^6 + Dh^8 + Eh^{10}$$

It is to be noted that "E±XX" in each aspheric coefficient refers to "$\times 10^{\pm XX}$".

In Numerical Examples 4 and 5, planes (planes each having a curvature radius ∞) R18 to R22 closest to the image side correspond to an insertion filter, an optical low pass filter, an infrared cut filter, and the like.

In Numerical Examples 1 and 4, the UV cured resin 1 and N-polyvinyl carbazole are used alone. In Numerical Examples 2, 3, and 5, the material is used in a state in which $TiO_2$ is dispersed in host polymer, and the refractive index of the $TiO_2$ particulate dispersed material is calculated using a value calculated using the above-described equation (d). In Numerical Example 2, the UV cured resin 1 is used as host polymer, and a volume ratio of $TiO_2$ is 20%. In Numerical Examples 3 and 5, UV cured resin 2 is used as host polymer, and volume ratios of $TiO_2$ are 20% and 3%, respectively.

TABLE 1

|  | Example 1 UV cured resin 1 | Example 2 TiO2 20%-UV cured resin 1 | Example 3 TiO2 20%-UV cured resin 2 | Example 4 N-polyvinyl carbazole | Example 5 TiO2 3%-UV cured resin 2 |
|---|---|---|---|---|---|
| d-line refractive index | 1.63555 | 1.78927 | 1.70877 | 1.69591 | 1.55624 |
| g-ray refractive index | 1.67532 | 1.85809 | 1.75988 | 1.75164 | 1.57249 |
| C-ray refractive index | 1.62807 | 1.77777 | 1.70033 | 1.68528 | 1.54936 |
| F-ray refractive index | 1.65604 | 1.82254 | 1.73310 | 1.72465 | 1.56326 |
| vd | 22.7 | 17.6 | 21.6 | 17.7 | 39.8 |
| θgd | 1.422 | 1.537 | 1.559 | 1.415 | 1.385 |
| θgF | 0.689 | 0.794 | 0.817 | 0.686 | 0.665 |

TABLE 2

|  | UV cured resin 2 | TiO2 |
|---|---|---|
| d-line refractive index | 1.52415 | 2.30377 |
| g-ray refractive index | 1.53706 | 2.45676 |
| C-ray refractive index | 1.52116 | 2.28032 |
| F-ray refractive index | 1.53133 | 2.37452 |
| νd | 51.6 | 13.8 |
| θgd | 1.269 | 1.624 |
| θgF | 0.563 | 0.873 |

NUMERICAL EXAMPLE 1

| f = 294 | Fno = 4.14 | 2ω = 8.42° | |
|---|---|---|---|
| R1 = ∞ | D1 = 3.30 | N1 = 1.58600 | ν 1 = 58.6 |
| R2 = ∞ | D2 = 0.15 | N2 = 1.60311 | ν 2 = 60.6 |
| R3 = 150.401 | D3 = 8.04 | N3 = 1.60311 | ν 3 = 60.6 |
| R4 = −313.692 | D4 = 0.15 | NGNL 1 = 1.63555 | ν GNL 1 = 22.7 |
| R5 = 66.327 | D5 = 8.15 | N4 = 1.84666 | ν 4 = 23.8 |
| R6 = 201.453 | D6 = 4.22 | N5 = 1.48749 | ν 5 = 70.2 |
| *R7 = −356.398 | D7 = 0.33 | N6 = 1.77250 | ν 6 = 49.6 |
| (Aspheric surface) | D8 = 3.40 | N7 = 1.84666 | ν 7 = 23.8 |
| R8 = −330.180 | D9 = 0.15 | N8 = 1.88300 | ν 8 = 40.8 |
| R9 = 95.662 | D10 = 7.95 | N9 = 1.84666 | ν 9 = 23.8 |
| R10 = 48.361 | D11 = 4.88 | N10 = 1.59551 | ν 10 = 39.2 |
| R11 = 122.204 | D12 = 3.00 | N11 = 1.84666 | ν 11 = 23.8 |
| R12 = 48.049 | D13 = 11.77 | N12 = 1.77250 | ν 12 = 49.6 |
| R13 = 33.156 | D14 = 4.00 | N13 = 1.77250 | ν 13 = 49.6 |
| R14 = ∞ | D15 = 2.69 | N14 = 1.51633 | ν 14 = 64.1 |
| (Aperture stop) | D16 = 2.00 | N15 = 1.48749 | ν 15 = 70.2 |
| R15 = 217.377 | D17 = 31.54 | | |
| R16 = −291.113 | D18 = 1.60 | | |
| R17 = 81.708 | D19 = 6.71 | | |
| R18 = 51.063 | D20 = 0.15 | | |
| R19 = 21.417 | D21 = 3.58 | | |
| R20 = −114.152 | D22 = 1.50 | | |
| R21 = 97.843 | D23 = 8.42 | | |
| R22 = −57.175 | D24 = 1.50 | | |
| R23 = 25.819 | D25 = 0.44 | | |
| R24 = −34.289 | D26 = 11.42 | | |
| R25 = −117.034 | D27 = 1.80 | | |
| R26 = 56.461 | | | |
| R27 = −17.994 | | | |
| R28 = −70.708 | | | |

Aspheric coefficient

| | k | B | C | D | E |
|---|---|---|---|---|---|
| 7-th plane | −1.440392E+01 | 4.995320E−09 | −1.821980E−11 | 3.159500E−15 | −2.187060E−19 |

NUMERICAL EXAMPLE 2

| f = 294 | Fno = 4.14 | 2ω = 8.42° | |
|---|---|---|---|
| R1 = ∞ | D1 = 3.30 | N1 = 1.58600 | ν 1 = 58.6 |
| R2 = ∞ | D2 = 0.15 | N2 = 1.66196 | ν 2 = 56.7 |
| R3 = 145.785 | D3 = 7.78 | NGNL 1 = 1.78927 | ν GNL 1 = 17.6 |
| R4 = −409.049 | D4 = 1.26 | N3 = 1.63119 | ν 3 = 59.2 |
| R5 = −225.467 | D5 = 0.15 | N4 = 1.85000 | ν 4 = 23.0 |
| R6 = 79.549 | D6 = 6.24 | N5 = 1.60363 | ν 5 = 40.0 |
| R7 = 189.549 | D7 = 5.19 | N6 = 1.85000 | ν 6 = 23.0 |
| R8 = −231.046 | D8 = 3.40 | N7 = 1.65301 | ν 7 = 31.6 |
| R9 = 205.144 | D9 = 25.48 | N8 = 1.88500 | ν 8 = 41.0 |
| R10 = 83.098 | D10 = 6.53 | N9 = 1.85000 | ν 9 = 23.0 |
| R11 = −503.582 | D11 = 0.15 | N10 = 1.61831 | ν 10 = 34.8 |
| R12 = 52.453 | D12 = 4.00 | N11 = 1.77638 | ν 11 = 25.2 |
| R13 = 35.937 | D13 = 10.06 | N12 = 1.86287 | ν 12 = 42.5 |
| R14 = ∞ | D14 = 0.91 | N13 = 1.53724 | ν 13 = 65.6 |
| (Aperture stop) | D15 = 4.69 | N14 = 1.61596 | ν 14 = 35.0 |
| R15 = 54.529 | D16 = 2.00 | N15 = 1.88500 | ν 15 = 41.0 |
| R16 = 288.972 | D17 = 28.15 | | |
| R17 = 42.732 | D18 = 2.40 | | |
| R18 = 123.421 | D19 = 7.01 | | |
| R19 = 32.856 | D20 = 0.15 | | |
| R20 = −57.494 | D21 = 3.65 | | |
| R21 = 181.625 | D22 = 2.40 | | |
| R22 = −70.687 | D23 = 5.30 | | |
| R23 = 39.430 | D24 = 2.40 | | |
| R24 = −29.062 | D25 = 3.31 | | |
| R25 = −69.241 | D26 = 6.07 | | |
| R26 = 68.420 | D27 = 2.40 | | |
| R27 = −47.670 | | | |
| R28 = −112.533 | | | |

NUMERICAL EXAMPLE 3

| f = 294 | Fno = 4.14 | | 2ω = 8.42° |
|---|---|---|---|
| R1 = ∞ | D1 = 3.30 | N1 = 1.58600 | ν 1 = 58.6 |
| R2 = ∞ | D2 = 0.15 | N2 = 1.71943 | ν 2 = 53.0 |
| R3 = 131.852 | D3 = 8.56 | N3 = 1.60168 | ν 3 = 61.3 |
| R4 = −346.555 | D4 = 0.15 | NGNL 1 = 1.70877 | ν GNL 1 = 21.6 |
| R5 = 72.296 | D5 = 6.28 | N4 = 1.86248 | ν 4 = 27.4 |
| R6 = 148.006 | D6 = 1.39 | N5 = 1.54721 | ν 5 = 51.1 |
| R7 = 244.534 | D7 = 2.79 | N6 = 1.85000 | ν 6 = 23.0 |
| R8 = −3838.833 | D8 = 3.40 | N7 = 1.64171 | ν 7 = 32.5 |
| R9 = 106.486 | D9 = 14.62 | N8 = 1.88500 | ν 8 = 41.0 |
| R10 = 50.572 | D10 = 6.71 | N9 = 1.85000 | ν 9 = 23.0 |
| R11 = 143.866 | D11 = 0.15 | N10 = 1.56211 | ν 10 = 42.8 |
| R12 = 51.210 | D12 = 4.00 | N11 = 1.85000 | ν 11 = 23.0 |
| R13 = 34.493 | D13 = 10.79 | N12 = 1.81818 | ν 12 = 46.0 |
| R14 = ∞ | D14 = 1.67 | N13 = 1.78000 | ν 13 = 50.0 |
| (Aperture stop) | D15 = 9.03 | N14 = 1.64039 | ν 14 = 32.7 |
| R15 = 74.863 | D16 = 2.00 | N15 = 1.85000 | ν 15 = 23.0 |
| R16 = −738.691 | D17 = 29.05 | | |
| R17 = 54.049 | D18 = 2.40 | | |
| R18 = 179.692 | D19 = 6.33 | | |
| R19 = 32.167 | D20 = 0.15 | | |
| R20 = −46.491 | D21 = 4.60 | | |
| R21 = 390.958 | D22 = 2.40 | | |
| R22 = −30.396 | D23 = 4.93 | | |
| R23 = 37.035 | D24 = 2.40 | | |
| R24 = −24.978 | D25 = 7.69 | | |
| R25 = −38.861 | D26 = 7.16 | | |
| R26 = 73.090 | D27 = 2.40 | | |
| R27 = −32.869 | | | |
| R28 = −73.397 | | | |

NUMERICAL EXAMPLE 4

| f = 7.21~17.5~27.16 | Fno = 2.91~4.20~4.37 | | 2ω = 63.9°~28.8°~18.8° |
|---|---|---|---|
| R1 = 19.170 | D1 = 2.99 | N1 = 1.58913 | ν 1 = 61.1 |
| R2 = 112.607 | D2 = Variable | N2 = 1.88300 | ν 2 = 40.8 |
| R3 = 25.368 | D3 = 0.80 | N3 = 1.69350 | ν 3 = 53.2 |
| R4 = 6.500 | D4 = 3.02 | N4 = 1.84666 | ν 4 = 23.8 |
| R5 = −30.977 | D5 = 0.70 | N5 = 1.74330 | ν 5 = 49.3 |
| R6 = 20.725 | D6 = 1.21 | N6 = 1.77250 | ν 6 = 49.6 |
| R7 = 13.953 | D7 = 1.94 | N7 = 1.84666 | ν 7 = 23.8 |
| R8 = 51.013 | D8 = Variable | NGNL 1 = 1.69590 | ν GNL 1 = 17.7 |
| R9 = ∞ | D9 = 0.24 | N8 = 1.81474 | ν 8 = 37.0 |
| (Aperture stop) | D10 = 1.83 | N9 = 1.51633 | ν 9 = 64.1 |
| *R10 = 9.809 | D11 = 2.07 | N10 = 1.55232 | ν 10 = 63.5 |
| (Aspheric surface) | D12 = 1.80 | N11 = 1.50378 | ν 11 = 66.9 |
| R11 = −47.985 | D13 = 0.60 | | |
| R12 = 13.438 | D14 = 0.52 | | |
| R13 = −10.398 | D15 = Variable | | |
| R14 = 4.820 | D16 = 1.87 | | |
| *R15 = 8.435 | D17 = Variable | | |
| (Aspheric surface) | D18 = 1.20 | | |
| *R16 = 21.777 | D19 = 0.72 | | |
| (Aspheric surface) | D20 = 0.80 | | |
| R17 = −62.851 | D21 = 0.50 | | |
| R18 = ∞ | | | |
| R19 = ∞ | | | |
| R20 = ∞ | | | |
| R21 = ∞ | | | |
| R22 = ∞ | | | |

| | Focal length | | |
|---|---|---|---|
| Variable interval | 7.21 | 17.50 | 27.16 |
| D2 | 0.60 | 5.46 | 11.53 |
| D8 | 16.80 | 3.41 | 1.41 |
| D15 | 5.08 | 6.16 | 13.19 |
| D17 | 5.00 | 11.39 | 11.35 |

| Aspheric coefficient | | | | | |
|---|---|---|---|---|---|
| | k | B | C | D | E |
| 10-th plane | −3.178062E+00 | 3.229590E−04 | −4.974120E−06 | 2.067310E−07 | −6.753400E−09 |
| 15-th plane | 0.00000E+00 | 2.35824E−04 | −1.81916E−07 | 1.74006E−06 | −1.35627E−07 |
| 16-th plane | 9.40402E+00 | −1.39676E−04 | −1.60857E−06 | 1.02301E−08 | −1.17795E−09 |

NUMERICAL EXAMPLE 5

| f = 7.21~17.5~27.16 | Fno = 2.91~4.20~4.37 | 2ω = 63.9°~28.8°~18.8° | |
|---|---|---|---|
| R1 = 20.730 | D1 = 2.71 | N1 = 1.69680 | ν 1 = 55.5 |
| R2 = 97.208 | D2 = Variable | N2 = 1.83400 | ν 2 = 37.2 |
| R3 = 27.911 | D3 = 0.80 | N3 = 1.60311 | ν 3 = 60.6 |
| R4 = 6.364 | D4 = 2.87 | N4 = 1.84666 | ν 4 = 23.8 |
| R5 = −33.353 | D5 = 0.70 | N5 = 1.81474 | ν 5 = 37.0 |
| R6 = 14.282 | D6 = 1.27 | N6 = 1.83481 | ν 6 = 42.7 |
| R7 = 12.159 | D7 = 1.90 | N7 = 1.84666 | ν 7 = 23.8 |
| R8 = 33.437 | D8 = Variable | NGNL 1 = 1.55324 | ν GNL 1 = 39.8 |
| R9 = ∞ | D9 = 0.24 | N8 = 1.83918 | ν 8 = 23.9 |
| (Aperture stop) | D10 = 1.85 | N9 = 1.51633 | ν 9 = 64.1 |
| *R10 = 8.628 | D11 = 2.00 | N10 = 1.55232 | ν 10 = 63.5 |
| (Aspheric surface) | D12 = 1.66 | N11 = 1.50378 | ν 11 = 66.9 |
| R11 = −71.270 | D13 = 0.60 | | |
| R12 = 84.706 | D14 = 0.73 | | |
| R13 = −7.749 | D15 = Variable | | |
| R14 = 5.171 | D16 = 1.77 | | |
| *R15 = 32.215 | D17 = Variable | | |
| (Aspheric surface) | D18 = 1.20 | | |
| *R16 = 20.945 | D19 = 0.72 | | |
| (Aspheric surface) | D20 = 0.80 | | |
| R17 = −101.499 | D21 = 0.50 | | |
| R18 = ∞ | | | |
| R19 = ∞ | | | |
| R20 = ∞ | | | |
| R21 = ∞ | | | |
| R22 = ∞ | | | |

| | Focal length | | |
|---|---|---|---|
| Variable interval | 7.21 | 17.50 | 27.16 |
| D 2 | 0.75 | 5.78 | 11.88 |
| D 8 | 15.29 | 3.08 | 1.45 |
| D 15 | 4.93 | 5.78 | 12.02 |
| D 17 | 5.00 | 11.29 | 10.63 |

| | Aspheric coefficient | | | | |
|---|---|---|---|---|---|
| | k | B | C | D | E |
| 10-th plane | −2.534032E+00 | 3.877650E−04 | −3.833270E−06 | 1.003040E−07 | −1.228490E−09 |
| 15-th plane | 0.00000E+00 | 5.01589E−04 | 8.65560E−06 | 1.77645E−06 | −1.19313E−07 |
| 16-th plane | 8.48546E+00 | −1.35129E−04 | −1.69060E−06 | 1.51943E−08 | −1.25766E−09 |

Next, an example of a digital still camera (image pickup apparatus) using the optical system of at least one exemplary embodiment as a photographing optical system will be described with reference to FIG. 11.

Figure 11:
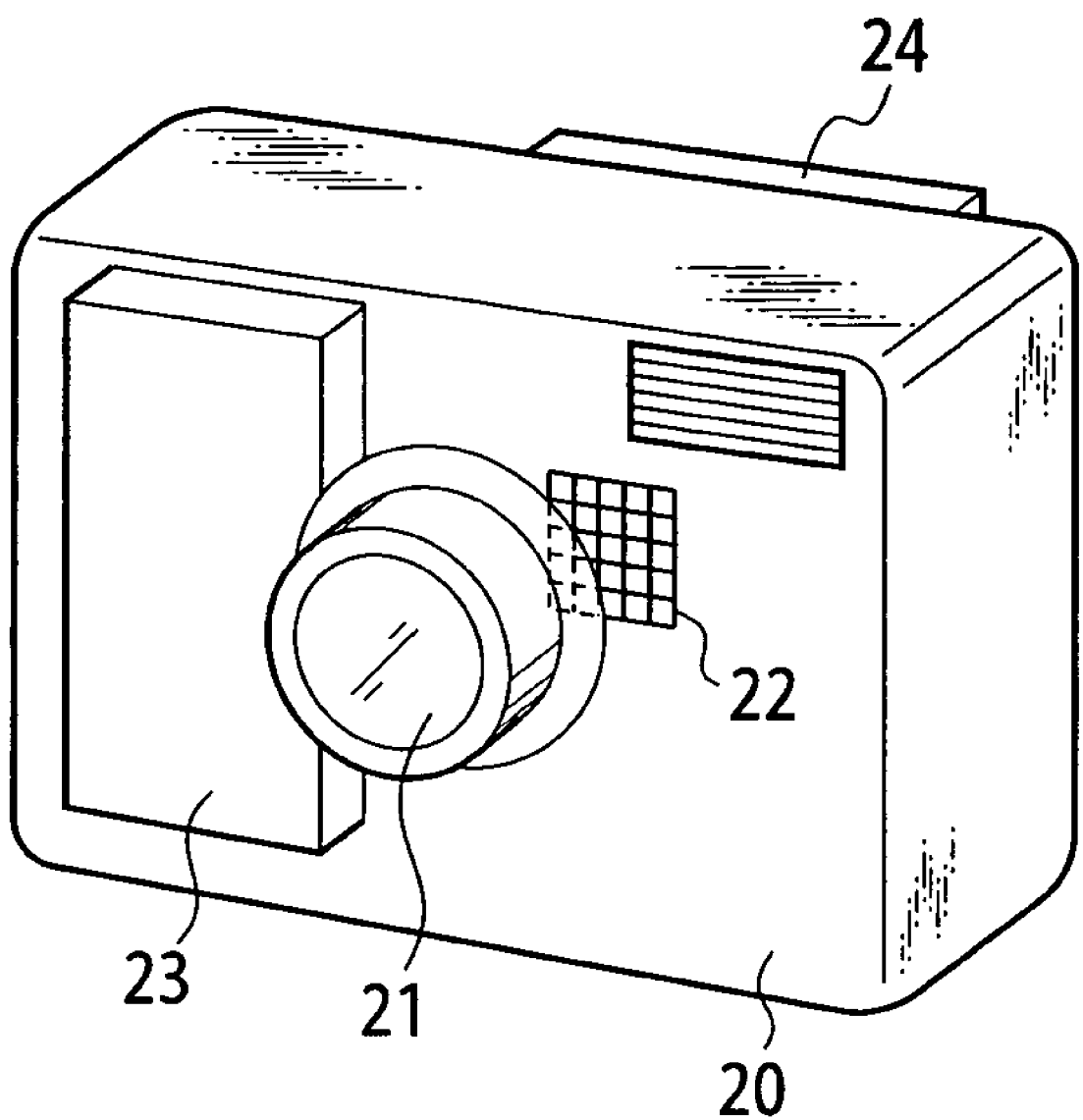
FIG. 11 is a schematic diagram of a main part of an imaging device.

In FIG. 11, reference numeral 20 denotes a camera main body, 21 denotes a photographing optical system constituted of an optical system of at least one exemplary embodiment, and 22 denotes a solid-state image pickup element (photoelectric conversion element) such as a CCD sensor or a CMOS sensor which is built in the camera main body and which receives light of an image of an object formed by the optical photographing system 21. Reference numeral 23 denotes a memory which records information corresponding to the image photoelectrically converted by the imaging element 22, and 24 denotes a finder which is constituted of a liquid crystal display panel and via which the subject image formed on the solid imaging element 22 is observed.

When an optical system of at least one exemplary embodiment is applied to an image pickup element such as a digital still camera in this manner, there is realized a small image pickup apparatus having a high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2004-335555, filed Nov. 19, 2004, which is hereby incorporated by reference herein in its entirety.

What is claimed is:

1. An optical system comprising: a solid material having refractive surfaces on both of a light incidence side and a light emergence side, wherein Abbe number vd and a partial dispersion ratio θgF of the solid material satisfy conditions:

$$-2.100 \times 10^{-3} \cdot vd + 0.693 < \theta gF;\text{ and}$$

$$0.555 < \theta gF < 0.9.$$

2. The optical system according to claim 1, wherein the partial dispersion ratio θgd of the solid material satisfies conditions:

$$-2.407 \times 10^{-3} \cdot vd + 1.420 < \theta gd;\text{ and}$$

$$1.2555 < \theta gd < 1.67.$$

3. The optical system according to claim 1, wherein the Abbe number vd of the solid material satisfies conditions:

$vd<60$.

4. The optical system according to claim 1, wherein the solid material is a resin.

5. The optical system according to claim 1, wherein the solid material is a mixture in which inorganic particulates are dispersed in a transparent medium.

6. The optical system according to claim 5, wherein the inorganic particulates are $TiO_2$ particulates.

7. The optical system according to claim 1, wherein assuming that an absolute value of a change ratio of a refractive index of a d-line with respect to a temperature in a range of 0° C. to 40° C. in the solid material is |dn/dT|, conditions are satisfied:

$|dn/dT|<2.5\times10^{-4}/°$ C.

8. The optical system according to claim 1, wherein the solid material is photo or thermally polymerization molded using a molding mold.

9. The optical system according to claim 1, wherein at least one of two refractive surfaces of the solid material has an aspheric shape.

10. The optical system according to claim 1, wherein at least one of two refractive surfaces of the solid material is brought into contact with air.

11. The optical system according to claim 1, wherein the optical system forms an image on a photoelectric conversion element.

12. An image pickup apparatus comprising:

the optical system according to claim 1; and a photoelectric conversion element which receives light of an image formed by the optical system.

13. An observation apparatus comprising:

the optical system according to claim 1.

14. A projector comprising:

the optical system according to claim 1.

* * * * *